United States Patent Office 2,966,780
Patented Jan. 3, 1961

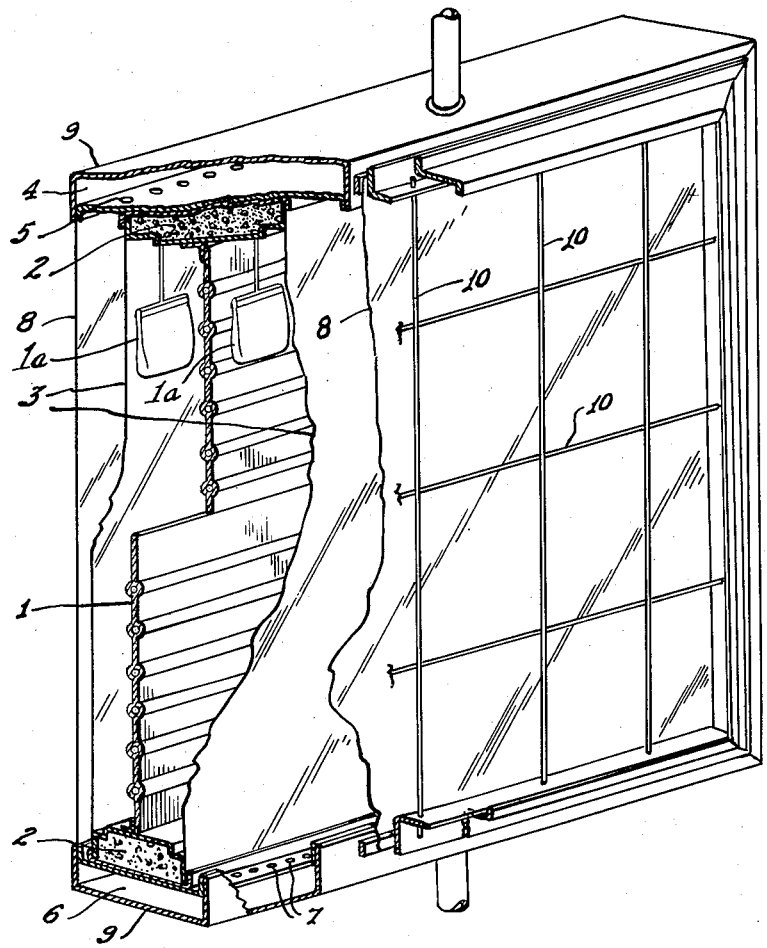

2,966,780

RADIANT COOLING SYSTEMS

Clarence A. Mills, Cincinnati, Ohio, assignor to Reflectotherm, Inc., Cincinnati, Ohio, a corporation of Ohio Filed Oct. 1, 1958, Ser. No. 764,644

5 Claims. (Cl. 62—272)

In my application Serial No. 714,164, filed February 10, 1958, and of which this application is a continuation-in-part, I have disclosed a carbon black coated cooling plate provided with means for circulating an air current or currents having a dew point or dew points below the temperature of the cooling plate, into close proximity with the cooling plate, the purpose being to prevent frosting, icing or fogging forming on the cooling plate.

In the modification of this general plan as set forth in the combination of apparatus disclosed herein and in my new modified system of preventing loss of radiation effectiveness by frosting and icing, I still propose to move currents of air having a dew point below the temperature of the cooling plate adjacent the cooling plate, but I interpose sheets of polyethylene between which the air with controlled dew point passes.

Thus in general I employ a carbon black coated plate coil provided with means for circulating a cooling medium even as low as 25 degrees below zero Fahrenheit which circulates through the coil and on both sides of this plate I mount spaced sheets of polyethylene held rigidly and I circulate currents of air having dew points below the temperature of the cold plate between the spaced sheets.

It is my purpose in the modifications of this system as set forth herein to effectively prevent frosting and icing or fogging of not only the cooling plate but also the sheets of polyethylene. In the chamber containing the cooling plate I insert a bag of silica gel to keep the air next the plate dry.

The dry bulb temperature of the air with low dew point circulated in the chambers between the polyethylene sheets must be at or above the wet bulb temperature of the air in which the products to be radiantly cooled are exposed to the radiant cooling action. Thus if the unit is used for cooling meat, the wet bulb temperature of the air surrounding the meat may be of the order of 40° to 90° F. This means that the dry bulb temperature of the air within the polyethylene sheet chamber will be of substantially this same temperature despite the fact that its dew point may be many degrees below zero. Dew point and dry bulb temperature have no relative relationship.

An integral and necessary part of my novel radiant cooling system is the use of carbon blacked surfacing materials on all cold plate receiving surfaces so that all wave lengths of radiant heat will be received and retained. Many kinds of blackened surfaces will absorb and retain the shorter wave lengths from 1 to 10 microns of infrared radiation. I have found that only carbon black coated plates will absorb and retain the ultra long 200 to 400 micron infrared wave lengths of latent heat emission from solidifying materials as they undergo a change of state.

The essential novelty of my new type radiant cooling system lies in the use of carbon blacked cold plates with adequate provision for maintaining any desired low plate surface temperatures and for maintaining a dew point of the air adjacent to the plates below the desired plate operating temperature, and for maintaining conditions adjacent to the surfaces of the encapsulating polyethylene sheets which effectively prevent their frosting, icing or fogging and a resultant interruption of free radiant heat passage from warm product to cold plate coil. Such radiant cooling system with dew point control is provided for radiant cooling as a cooling tunnel unit or as a complete radiant cooling system for insertion into existing tunnels, or for operation without enclosure.

This theory having been explained, I will now describe my novel cooling unit which is adaptable for use either in a tunnel which is built new or for replacement in an existing tunnel, or for operation without enclosure.

In the drawing:

The figure is a perspective view of a suitable unit with portions cut away to indicate various elements of the combination in section.

There is indicated at 1 my preferred type of cooling plate which is of the tube-in-strip type as described in my application, Serial No. 714,164, as a type of hollow sheet metal fabrication having a plurality of interconnected passageway portions and which may be made, for example, in accordance with the teachings of the Grenell Patent No. 2,690,002. Through the coils there is circulated a cooling medium at a predetermined and controlled temperature and which may be very cold. A bags of silica gel 1-a keeps the air in contact with the plate with a very low dew point.

There is indicated at 2 the insulated rigid plate coil framing. At 3 I have shown the polyethylene wrapping which encloses the cold plate and frame. At 4 I have indicated the desiccated air inlet header and at 5 perforations in the header for the introduction of the desiccated air having a low dew point.

At 6 there is indicated the desiccated air outlet header with the perforations 7 in the header through which the air passes between the sheets of polyethylene 8 which, with the polyethylene wrapping 3, forms narrow chambers perhaps about one-half inch across between the polyethylene sheets.

The polyethylene sheets 8 are sealed to the sealing frame as indicated. 9 is the sealing frame which holds the unit together and in which the aluminum wire rods 10 strengthen the assembly and help protect it against damage from moving objects and, being of small diameter, do not interfere with the free flow of radiations through the polyethylene sheets to be absorbed by the cold plate.

As stated, units of the type shown in the drawings may be made with different dimensions, and they may be used for a wide variety of radiation cooling purposes. As a system the cooling plate may be effectively used. As long as the polyethylene chambers are arranged adjacent the cold plate and as long as the dew point and dry bulb temperature of the air circulating through the chambers are maintained as above described so as to prevent fogging, glazing, and frosting of all polyethylene surfaces, effective absorption of radiant rays emitted from warmer products to be cooled may be effectively carried out.

It will be obvious that in some instances where there is no requirement of cooling except from one surface of the cold plate, that one of the pairs of polyethylene sheets shown as on both sides of the cold plate may be eliminated and radiant cooling may be carried out by exposing only one surface of the cold plate. The purpose of mounting the cold plate in a casing with permanently sealed spaced sheets of polyethylene adjacent the cold plate is to prevent air currents carrying moisture to come in contact with the cold plate, and to maintain dry bulb temperature and dew point conditions adjacent all polyethylene surfaces which will prevent their frosting, icing or fogging, which impairs the receptivity of the cold plate to the absorption of the emissive heat rays coming from the articles to be cooled.

The apparatus necessary for maintaining a desired dry bulb temperature and proper dew point conditions forms no part of my invention as set forth herein excepting that such air is introduced through the pipe shown at the top of the header and withdrawn through the pipe at the bottom is maintained in the desired equilibrium of a dew point below the temperature of the plate coil and a dry bulb temperature at least slightly above the wet bulb temperature of the air adjacent the product being cooled.

Having thus described my invention, what I claim as new and desire to secure by Letters Patent is:

1. In a low temperature radiant cooling unit the combination in an enclosing cabinet of a vertically positioned carbon black coated plate coil provided with means for circulating a cooling medium through the coils of the plate, a pair of rigidly supported spaced sheets of polyethylene adjacent one surface of the carbon black coated plate coil and retained in a rigid frame, headers in the frame for admitting air with a controlled dew point and dry bulb temperature to pass between the polyethylene sheets.

2. A system of radiant cooling wherein radiant heat rays including ultra long of 200 to 400 microns and all other shorter infrared wave lengths are absorbed by a cold plate coated with carbon black coating which includes means for circulating a cooling medium through the cold plate and a pair of spaced polyethylene sheets having a chamber between the sheets arranged adjacent the cold plate, and means for circulating air through the chamber having a dew point lower than the temperature to which the cold plate is cooled, said air being maintained at a temperature no lower than the dry bulb temperature surrounding articles to be cooled by emission of radiant heat waves through the polyethylene sheets and absorption by the cold plate.

3. A system of radiant cooling which includes a cold plate receptive to emissive heat rays up to and including ultra long rays of from 200 to 400 microns, wave lengths, means for drying the air surrounding the cold plate, and a low dew point chamber formed by sheets of polyethylene which are held rigidly in alignment adjacent the cold plate and which is provided with means for circulating low dew point air through the chamber, said low dew point air having a dry bulb temperature at least as high as that surrounding articles to be cooled.

4. A radiant cooling system including a carbon blacked cold plate receptive to emissive rays including all infrared heat radiations up to 200 to 400 microns wave length and which consists of an anti-frosting and icing device fixedly mounted adjacent the cold plate consisting in a pair of rigidly supported spaced polyethylene spaced sheets provided with air currents having a dew point lower than the temperature of the cold plate and a dry bulb temperature at least slightly above the wet bulb temperature of the air adjacent the product being cooled.

5. A radiant cooling system including a carbon blacked cold plate receptive to emissive rays including all infrared heat radiations up to 200 to 400 microns wave length and which consists of an anti-frosting and icing device fixedly mounted adjacent the cold plate consisting in a pair of rigidly supported spaced polyethylene sheets provided with air currents having a dew point lower than the temperature of the cold plate and a dry bulb temperature equal to the wet bulb temperature of the air surrounding articles to be cooled.

References Cited in the file of this patent

UNITED STATES PATENTS

| | | |
|---|---|---|
| 2,128,386 | Warren | Aug. 20, 1938 |
| 2,188,349 | Heideman | Jan. 30, 1940 |
| 2,425,714 | Baer | Aug. 19, 1947 |